United States Patent
VanBlon et al.

(10) Patent No.: US 9,971,412 B2
(45) Date of Patent: May 15, 2018

(54) ENABLING DEVICE FEATURES ACCORDING TO GESTURE INPUT

(71) Applicant: LENOVO (Singapore) PTE, LTD., New Tech Park (SG)

(72) Inventors: Russell Speight VanBlon, Raliegh, NC (US); John Carl Mese, Cary, NC (US); Nathan J. Peterson, Durham, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 537 days.

(21) Appl. No.: 14/137,386

(22) Filed: Dec. 20, 2013

(65) Prior Publication Data

US 2015/0177841 A1 Jun. 25, 2015

(51) Int. Cl.
*G06F 3/01* (2006.01)
*G06F 3/0346* (2013.01)
*G06F 1/16* (2006.01)

(52) U.S. Cl.
CPC .............. *G06F 3/017* (2013.01); *G06F 1/163* (2013.01); *G06F 1/1694* (2013.01); *G06F 3/011* (2013.01); *G06F 3/0346* (2013.01)

(58) Field of Classification Search
CPC ........ G06F 3/017; G06F 1/163; G06F 1/1694; G06F 3/0346
See application file for complete search history.

(56) References Cited

U.S. PATENT DOCUMENTS

| | | | | |
|---|---|---|---|---|
| 6,498,600 B1* | 12/2002 | Vance | ................... | G06F 3/0202 200/5 R |
| 7,905,769 B1* | 3/2011 | Harrison, Jr. | ............. | A63F 9/24 434/2 |
| 8,228,292 B1* | 7/2012 | Ruiz | ..................... | G06F 1/1626 345/156 |
| 8,744,645 B1* | 6/2014 | Vaghefinazari | .... | G01C 21/3608 701/1 |
| 8,957,847 B1* | 2/2015 | Karakotsios | ............ | G06F 3/013 345/156 |
| 9,047,052 B2* | 6/2015 | Schmehl | ................ | G06F 1/1643 |
| 9,089,270 B2* | 7/2015 | Song | .................. | A61B 5/02438 |
| 9,094,576 B1* | 7/2015 | Karakotsios | ........... | H04N 7/157 |
| 9,218,034 B2* | 12/2015 | Rabii | ........................ | G06F 1/26 |
| 9,288,471 B1* | 3/2016 | Yang | .................. | H04N 13/0221 |

(Continued)

FOREIGN PATENT DOCUMENTS

| | | | |
|---|---|---|---|
| CN | 101008873 A | 8/2007 | |
| CN | 102246125 A | 11/2011 | |

(Continued)

*Primary Examiner* — Ajay M Bhatia
*Assistant Examiner* — Phoebe X Pan
(74) *Attorney, Agent, or Firm* — Kunzler, PC

(57) ABSTRACT

A method, apparatus, and program product are disclosed for determining an initial position of an electronic device using a positioning sensor located on the electronic device, detecting, based on movement away from the initial position, a gesture using a gesture detector located on the electronic device, and enabling a feature of the electronic device in response to the detected gesture being a feature-enabling gesture.

15 Claims, 6 Drawing Sheets

(56) References Cited

U.S. PATENT DOCUMENTS

| | | | | |
|---|---|---|---|---|
| 2005/0212760 | A1* | 9/2005 | Marvit | G06F 1/1613 345/156 |
| 2006/0093161 | A1* | 5/2006 | Falcon | H03G 3/3026 381/104 |
| 2007/0259716 | A1* | 11/2007 | Mattice | G06F 3/013 463/36 |
| 2009/0060170 | A1* | 3/2009 | Coughlan | H04M 1/605 379/433.02 |
| 2009/0195497 | A1* | 8/2009 | Fitzgerald | G06F 1/3203 345/156 |
| 2009/0295832 | A1 | 12/2009 | Takatsuka et al. | |
| 2010/0009650 | A1* | 1/2010 | Orr | G06F 1/3203 455/343.1 |
| 2012/0016641 | A1* | 1/2012 | Raffa | G06F 1/1694 703/2 |
| 2012/0054691 | A1* | 3/2012 | Nurmi | G06Q 10/10 715/854 |
| 2012/0188158 | A1* | 7/2012 | Tan | A61B 5/0488 345/156 |
| 2012/0306770 | A1* | 12/2012 | Moore | G06F 3/01 345/173 |
| 2013/0128022 | A1* | 5/2013 | Bose | H04N 7/18 348/77 |
| 2013/0159350 | A1* | 6/2013 | Sankar | G06F 3/011 707/784 |
| 2013/0316679 | A1* | 11/2013 | Miller | H04M 1/6041 455/412.1 |
| 2014/0055426 | A1* | 2/2014 | Park | G06F 3/017 345/179 |
| 2014/0143737 | A1* | 5/2014 | Mistry | G06F 3/0488 715/854 |
| 2014/0156269 | A1* | 6/2014 | Lee | G06F 1/3206 704/231 |
| 2014/0173747 | A1* | 6/2014 | Govindaraju | G06F 21/629 726/27 |
| 2014/0189397 | A1* | 7/2014 | Kanai | H04M 1/67 713/320 |
| 2015/0092520 | A1* | 4/2015 | Robison | G04G 21/02 368/9 |
| 2015/0185837 | A1* | 7/2015 | Whitney | G06F 3/014 345/156 |
| 2016/0018900 | A1* | 1/2016 | Tu | G06F 1/3234 345/156 |
| 2016/0048161 | A1* | 2/2016 | Carceroni | G06F 1/163 361/679.03 |

FOREIGN PATENT DOCUMENTS

| | | |
|---|---|---|
| CN | 102473024 A | 5/2012 |
| CN | 102609091 A | 7/2012 |
| CN | 103217895 A | 7/2013 |

* cited by examiner

ENABLING DEVICE FEATURES ACCORDING TO GESTURE INPUT

BACKGROUND

Field

The subject matter disclosed herein relates to gesture input and more particularly relates to enabling device features according to gesture input.

Description of the Related Art

As smart devices become smaller, the amount of space available for physical interface components, such as buttons, switches, etc., is being reduced. Smart watches, for example, generally do not provide much space for physical buttons because most of the available device area is dedicated to a display. Thus, physical buttons may be placed in awkward locations on the device. Alternatively, the device may incorporate a touch-enabled display; however, such a display may be difficult to interact with on devices with small screen sizes, such as a smart watch. Other devices may not allow physical interaction altogether, such as an optical head-mounted display.

BRIEF SUMMARY

A method for enabling device features according to gesture input is disclosed. An apparatus and computer program product also perform the functions of the method.

In one embodiment, a method is described that includes determining an initial position of an electronic device using a positioning sensor located on the electronic device. In another embodiment, the method includes detecting, based on movement away from the initial position, a gesture using a gesture detector located on the electronic device. In a further embodiment, the method includes enabling a feature of the electronic device in response to the detected gesture being a feature-enabling gesture.

In one embodiment, the electronic device includes a wearable device. In another embodiment, the initial position of the wearable device is determined based on the position of the wearable device on a user's body. In a further embodiment, enabling a feature of the electronic device includes enabling speech recognition capabilities of the electronic device such that the electronic device recognizes voice commands provided by a user. In yet another embodiment, the electronic device includes a plurality of microphones configured to detect voice input. In some embodiments, at least a portion of the microphones are enabled in response to the detected gesture.

In another embodiment, the electronic device performs a task associated with a voice command in response to detecting a predetermined gesture. In one embodiment, speech recognition is enabled in response to a completed gesture such that voice commands are not received while the gesture is being performed. In a further embodiment, enabling a feature of the electronic device includes enabling a display of the electronic device. In certain embodiments, the method includes disabling the enabled feature of the electronic device in response to performing the feature-enabling gesture in reverse or performing the feature-enabling gesture again. In another embodiment, the method includes detecting a feature-enabling gesture within a predetermined period of time after a notification is received on the electronic device. In some embodiments, a feature-enabling gesture that is not performed within the predetermined period of time is ignored.

In one embodiment, the feature-enabling gesture includes a combination of a primary gesture and one or more secondary gestures such that a feature is enabled in response to detecting one or more secondary gestures after the primary gesture is performed. In another embodiment, the electronic device comprises a low-power state and a high-power state. In some embodiments, the low-power state is configured to detect movement within a predetermined movement threshold. In another embodiment, the high-power state is configured to detect movement exceeding the predetermined movement threshold. In a further embodiment, a gesture is detected in response to the electronic device switching from a low-power state to a high-power state.

In some embodiments, the method includes calibrating the one or more gesture detectors located on the electronic device based on the initial position of the electronic device. In one embodiment, the electronic device includes a calibration sensor configured to calibrate the electronic device. In another embodiment, the method includes defining a feature-enabling gesture based on user input such that a user-defined gesture is associated with a feature of the electronic device.

The apparatus, in one embodiment, includes a processor, a positioning sensor operably coupled to the processor, and a memory that stores machine readable code executable by the processor. In one embodiment, the apparatus includes a setup module that determines an initial position of an electronic device using a positioning sensor located on the electronic device. The apparatus, in another embodiment, includes a gesture module that detects, based on movement away from the initial position, a gesture using a gesture detector located on the electronic device. In some embodiments, the apparatus includes a feature module that enables a feature of the electronic device in response to the detected gesture being a feature-enabling gesture.

In one embodiment, the apparatus includes a deactivate module that disables the enabled feature of the electronic device in response to performing the feature-enabling gesture in reverse or performing the feature-enabling gesture again. The apparatus, in a further embodiment, includes a notification module that ignores a feature-enabling gesture in response to the feature-enabling gesture not being performed within a predetermined period of time after receiving a notification. In certain embodiments, the apparatus includes a tuning module that calibrates the one or more gesture detectors located on the electronic device based on the initial position of the electronic device. In some embodiments, the electronic device includes a calibration sensor configured to calibrate the electronic device.

In one embodiment, the apparatus includes a customization module that defines a feature-enabling gesture based on user input such that a user-defined gesture is associated with a feature of the electronic device. In a further embodiment, the electronic device comprises a wearable device. In another embodiment, initial position of the wearable device is determined based on the position of the wearable device on a user's body.

A program product is disclosed including a computer readable storage medium storing machine readable code executable by a processor to perform the operations. In one embodiment, the operations include determining an initial position of an electronic device using a positioning sensor located on the electronic device. In some embodiments, the operations include detecting, based on movement away from the initial position, a gesture using a gesture detector located on the electronic device. In another embodiment, the operations include enabling a feature of the electronic device in response to the detected gesture being a feature-enabling gesture.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
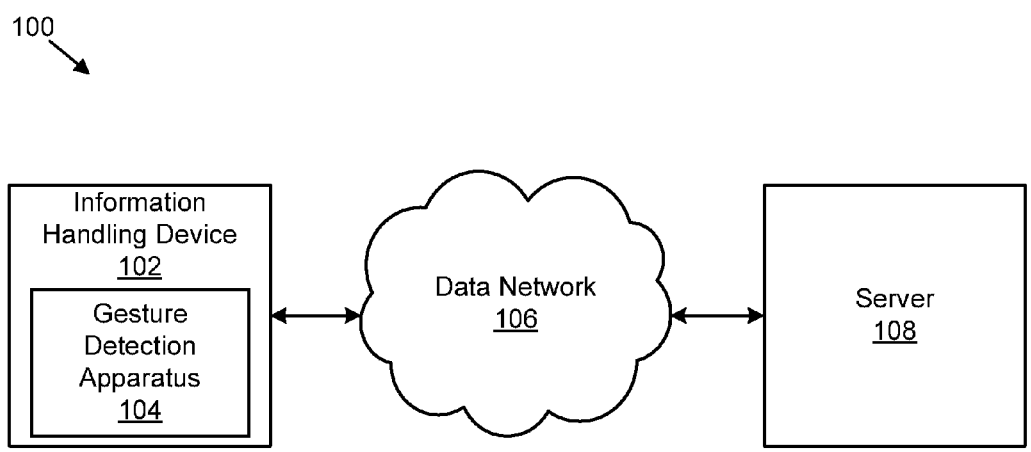
FIG. 1 is a schematic block diagram illustrating one embodiment of a system for enabling device features according to gesture input.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements. FIG. 1 depicts one embodiment of a system 100 for enabling device features according to gesture input. In one embodiment, the system 100 includes an information handling device 102, a gesture detection apparatus 104, a data network 106, and a server 108, which are described in more detail below.

In certain embodiments, the information handling device 102 includes a wearable electronic device 102, such as a smart watch, a head-mounted optical display, and/or the like. In some embodiments, the information handling device 102 includes a mobile device, such as a smart phone, tablet computer, PDA, and/or the like. In another embodiment, the information handling device 102 receives gesture input from a gesture input detector, such as a digital camera, an infrared camera, and/or the like. The information handling device 102, in one embodiment, includes other gesture detecting sensors, such as gravity sensors, proximity sensors, body sensors, accelerometers, and/or the like. In another embodiment, the information handling device 102 includes one or more microphones that detect voice input. In some embodiments in which the information handling device 102 is a wearable electronic device, the electronic device may be in communication with a second information handling device 102, such as a smart phone, or the like. In certain embodiments, the information handling device 102 includes one or more applications, programs, and/or the like, configured to execute on the information handling device 102.

In one embodiment, the gesture detection apparatus 104 is configured to determine an initial position of an electronic device 102 using a positioning sensor located on the electronic device 102. In another embodiment, the gesture detection apparatus 104 detects, based on movement away from the initial position, a gesture using a gesture detector located on the electronic device 102. In a further embodiment, the gesture detection apparatus 104 enables a feature of the electronic device 102 in response to the detected gesture being a feature-enabling gesture. The gesture detection apparatus 104, in one embodiment, includes one or more modules that perform the operations associated with enabling device features according to gesture input. The gesture detection apparatus 104, including its associated modules, are described in more detail below with reference to FIGS. 2 and 3.

In another embodiment, the system 100 includes a data network 106. The data network 106, in certain embodiments, is a digital communication network 106 that transmits digital communications related to enabling device features according to gesture input. The digital communication network 106 may include a wireless network, such as a wireless telephone network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 may include one or more servers, routers, switches, and/or other networking equipment. The digital communication network 106 may also include computer readable storage media, such as a hard disk drive, an optical drive, non-volatile memory, random access memory ("RAM"), or the like.

The system 100, in another embodiment, includes a server 108. The server 108, in some embodiments, includes a main frame computer, a desktop computer, a laptop computer, a cloud server, a smart phone, a tablet computer, and/or the like. In one embodiment, the information handling device 102 is communicatively coupled to the server 108 through the data network 106. In another embodiment, the information handling device 102 accesses data stored on the server 108 through the data network 106.

Figure 2:
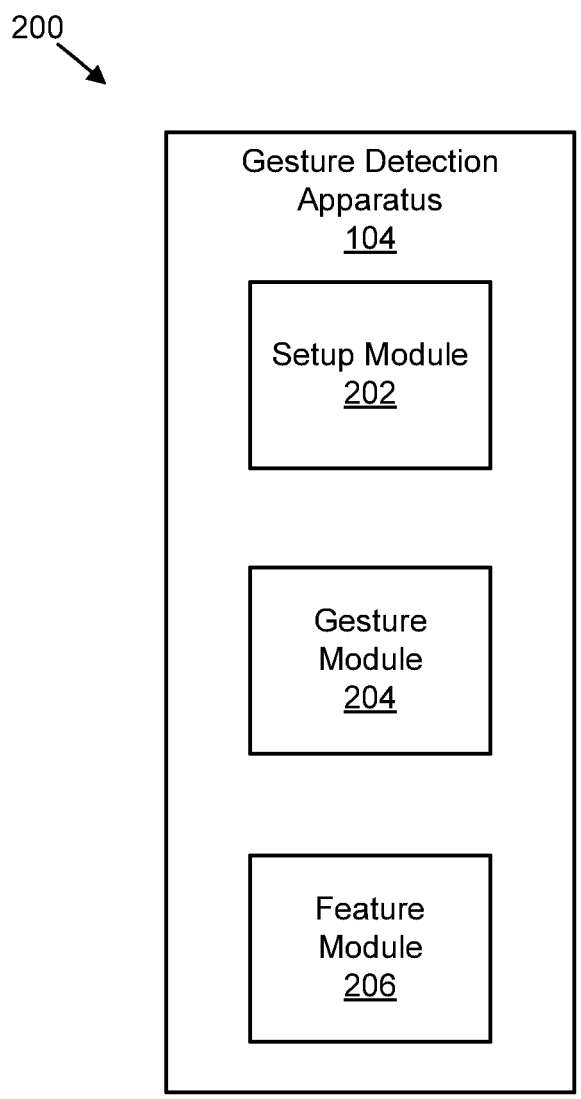
FIG. 2 is a schematic block diagram illustrating one embodiment of an apparatus for enabling device features according to gesture input.

FIG. 2 depicts one embodiment of an apparatus 200 for enabling device features according to gesture input. In certain embodiments, the apparatus 200 includes an embodiment of a gesture detection apparatus 104. The gesture detection apparatus 104, in another embodiment, includes a setup module 202, a gesture module 204, and a feature module 206, which are described below in more detail.

The setup module 202, in one embodiment, determines an initial position of an electronic device 102 using a positioning sensor located on the electronic device 102. In certain embodiments, such as when the electronic device 102 is a wearable device, for example, a gesture may begin from any number of positions. For example, if the electronic device 102 is a smart watch worn on a user's arm, the gesture may begin from an arm position at the user's side, from a folded-arm position, and/or the like. Thus, in order to determine a starting position for the gesture, the setup module 202 determines an initial position based on input received form one or more sensors located on the electronic device 102. For example, a gravity sensor may be used to determine the starting orientation of the electronic device 102, a body sensor may detect the part of the body the electronic device 102 is located, and/or the like.

In some embodiments, the setup module 202 delays a predetermined amount of time after detecting movement below a predefined threshold before determining the initial position of the electronic device 102. For example, the setup module 202 may wait until the user's arm stops moving in a vertical direction in order to determine the electronic device 102 is being held on the side of the user's body. In some embodiments, it may be inefficient to wait until the electronic device 102 is perfectly still before determining the initial position of the electronic device 102. Thus, the setup module 202 may only delay until the detected movement of the electronic device 102 is below a predefined threshold. Therefore, the setup module 202 may detect slight movements of the electronic device 102, and yet still determine the initial position of the device 102. The setup module 202, in certain embodiments, receives the predetermined amount of delay time and/or the predefined threshold value from a user.

The gesture detection apparatus 104, in one embodiment, includes a gesture module 204 that detects a gesture using one or more gesture detectors located on the electronic device 102 based on movement away from the determined initial position of the electronic device 102. In certain embodiments, the gesture module 204 receives input from one or more gesture detectors/sensors located on the electronic device 102 in order to detect a gesture. The gesture detectors may include accelerometers, digital cameras, infrared cameras, proximity sensors, gravity sensors, orientation sensors, capacitance sensors, and/or the like. For example, where the electronic device 102 is a wearable smart watch, the gesture module 204 may receive input from an accelerometer to detect the movement of an arm. Alternatively, the gesture module 204 may receive input from an orientation sensor to detect rotation of the arm, a proximity sensor to detect how close the device 102 is to the body, and/or the like.

In certain embodiments, an arm gesture may comprise an upward movement combined with a clockwise turn, which may indicate that a user is looking at a watch (or any wearable device 102) being worn on the user's arm or held in a user's hand. In another embodiment, the gesture may comprise shaking a device 102 and forth to enable certain features of the device 102. In yet another embodiment, the gesture may comprise the motion associated with bringing a device 102 within close proximity to the user's mouth. In such an embodiment, the gesture module 204 determines the position of the elbow (e.g., the direction the elbow is pointing), the location of the hand relative to the user's face, the position of the user's wrist (e.g., back of the wrist pointing towards or away from the user), and/or the like.

In certain embodiments, the gesture module 204 detects a gesture comprising a combination of a primary gesture and one or more secondary gestures such that a feature is enabled in response to detecting one or more secondary gestures after the primary gesture is performed. For example, the gesture module 204 may detect a primary gesture comprising a rotation of the device 102 (e.g., turning the display screen towards the user's face) and a secondary gesture comprising determining the user is looking at the device 102. Alternatively, in an embodiment comprising a head-mounted optical display, the gesture module 204 may detect a primary gesture comprising determining the user is looking in a first direction and detecting a secondary gesture comprising determining the user is looking in a second direction.

In a further embodiment, the electronic device 102 comprises a low-power state and a high-power state. The low-power state may be configured to detect movement within a predetermined movement threshold and the high-power state may be configured to detect movement exceeding the predetermined movement threshold. In such an embodiment, the gesture module 204 detects a gesture in response to the electronic device 102 switching from a low-power state to a high-power state. In certain embodiments, the low-power state is monitored by a low-power processor such that low-functionality processing may be performed without enabling high-functionality processing. For example, the low-power processor may detect when the device 102 is slightly moving, such as movements detected on a smart watch while the user is walking.

The gesture module 204 may determine that these movements are not sufficient to constitute determining whether the movements comprise a gesture until the movements surpass a predetermined movement threshold. In certain embodiments, the gesture module 204 enables a high-power processor in response to determining the movements exceed the predetermined threshold in order to enable high-functionality processing to detect a gesture being performed by the user. In certain embodiments, the electronic device 102 includes a programmable logic device, such as an FPGA, ASIC, and/or the like, which performs the operations associated with gesture detection.

In one embodiment, the gesture detection apparatus 104 includes a feature module 206 that enables a feature of the electronic device 102 in response to the detected gesture being a feature-enabling gesture. In certain embodiments, the gesture module 204 detects one or more gestures that may not be recognized by the feature module 206 as feature-enabling gestures. In such an embodiment, the feature module 206 ignores the gestures and does not enable any features of the device 102 in response to the detected gestures. In certain embodiments, however, the feature module 206 recognizes one or more gestures detected by the gesture module 204 as feature-enabling gestures.

In one embodiment, the feature module 206 enables speech recognition capabilities of the electronic device 102 in response to a feature-enabling gesture. In such an embodiment, the electronic device 102 is capable of recognizing voice commands provided by a user. For example, the feature module 206 may recognize a gesture from a user wearing a smart watch that enables a plurality of microphones on the device 102, such as raising the watch close to the user's mouth. The gesture module 204, using one or more gesture detectors, may detect the raising of the user's arm, the proximity of the watch to the user's mouth, the position of the elbow, and/or the like, to determine a gesture is being performed. Based on the gesture, the feature module 206 may then determine whether the gesture is a feature-enabling gesture, and, if so, activate the plurality of microphones (or one of various possible actions).

In another embodiment where speech recognition is enabled, the electronic device 102 performs a command associated with a voice command without receiving the voice command in response to the gesture module 204 detecting a gesture corresponding to the voice command. For example, the electronic device 102 may associate a voice command such as "Call John" with a command that executes a phone application and calls a contact named John. The same voice command, however, may also be associated with a gesture such that the user may perform the gesture without giving a voice command to call John. The gesture, for example, may include bringing a smart phone up to a user's ear and shaking it back and forth, or the like.

In certain embodiments, the feature module 206 enables speech recognition in response to a completed gesture, such that voice commands are not received while the gesture is being performed. Thus, if speech recognition was enabled prior to the gesture, the feature module 206, in some embodiments, disables speech recognition while the gesture is being performed and re-enables the speech recognition at the end of the gesture in order to receive voice commands from a user. In a further embodiment, the feature module 206 enables a display of the electronic device 102 in response to the feature-enabling gesture. In this manner, the display does not have to be constantly on or manually turned-on, but may be enabled through the use of a gesture. The feature-enabling gesture detected by the feature module 206, for example, may include detecting the raising of an arm and detecting the user is looking at the device 102. In another example, the feature module 206 may enable the device 102 display in response to a user shaking a watch located on the user's wrist. As described above, one or more sensors located on the device 102 may be used to determine the gesture being performed.

Figure 3:
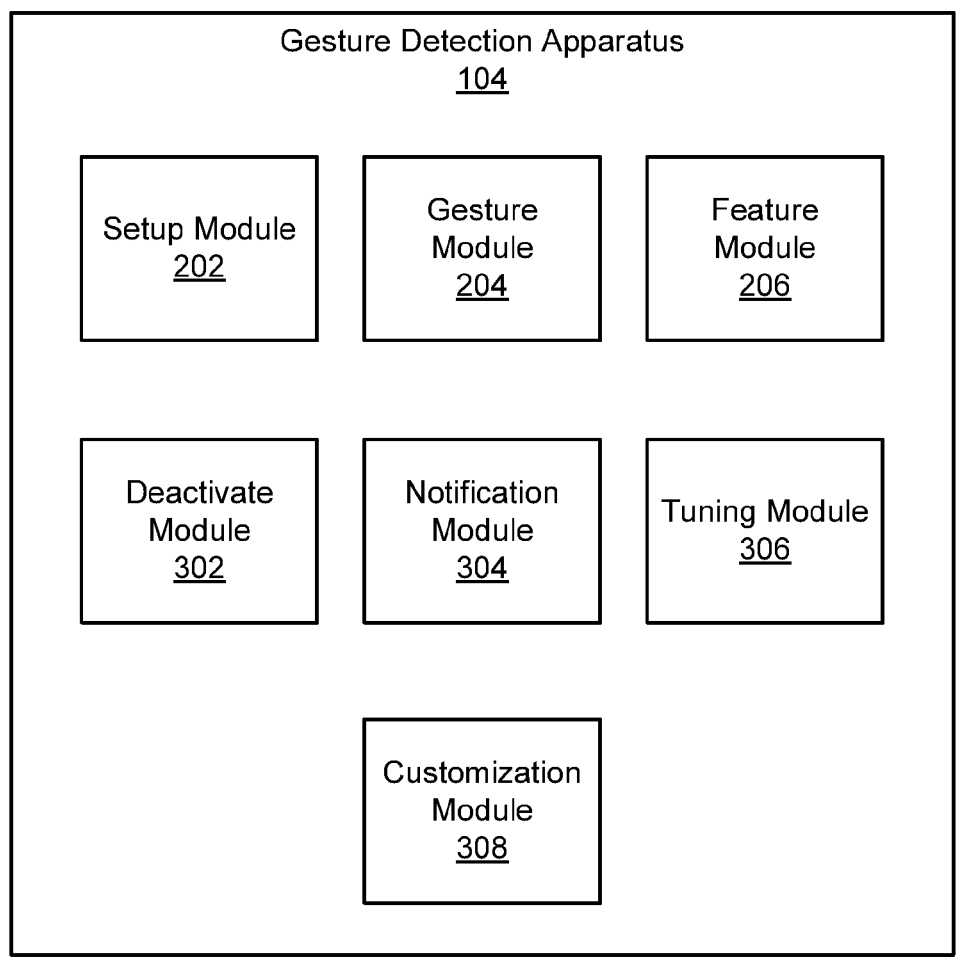
FIG. 3 is a schematic block diagram illustrating another embodiment of an apparatus for enabling device features according to gesture input.

FIG. 3 depicts another embodiment of an apparatus 300 for enabling device features according to gesture input. In one embodiment, the apparatus 300 includes an embodiment of a gesture detection apparatus 104. The gesture detection apparatus 104, in certain embodiments, includes a setup module 202, a gesture module 204, and a feature module 206, which are substantially similar to the setup module 202, gesture module 204, and feature module 206 described with reference to FIG. 2. The gesture detection apparatus 104, in a further embodiment, includes a deactivate module 302, a notification module 304, a tuning module 306, and a customization module 308, which are described below.

In one embodiment, the deactivate module 302 disables an enabled feature of the electronic device 102 in response to performing a feature-enabling gesture in reverse. For example, the feature module 206 may enable a voice activation feature of the device 102 in response to the gesture module 204 detecting a gesture comprising rotating the device 102 and bringing the device 102 within close proximity to the user's face. In order to disable the enabled gesture, the deactivate module 302 detects the feature-enabling gesture performed in reverse order. Thus, in the above example, the user may disable the voice activation feature of the device 102 by bringing the device 102 away from the user's face and rotating the device in the opposite direction. In another embodiment, the deactivate module 302 disables an enabled feature of the electronic device 102 in response to performing a feature-enabling gesture again. For example, the display of a smart watch may be toggled on and off in response to repeatedly performing a display-enabling feature.

In another embodiment, the notification module 304 detects a feature-enabling gesture within a predetermined period of time after a notification is received on the electronic device 102. In one embodiment, in response to a notification being received, the notification module 304 may enable one or more sensors on the electronic device 102 in order to detect a feature-enabling gesture. For example, after a notification is received by the device 102, a user may typically move the device 102 into a position to view the notification on the device 102. Thus, the notification module 304 may enable one or more sensors to detect such a gesture, which may enable one or more features of the device 102, such as enabling a display, voice activation, and/or the like. In certain embodiments, a feature-enabling gesture not performed within the predetermined period of time is ignored. For example, the predetermined amount of time to detect a gesture after a notification may be set to five seconds such that any gestures received five seconds after a notification is received may be ignored.

In certain embodiments, the tuning module 306 calibrates the one or more gesture detectors located on the electronic device 102 based on the initial position of the electronic device 102. For example, the tuning module 306 may receive one or more settings from a user that determines the initial settings of the device 102. A user, for example, may specify which arm a watch is being worn on, the location of the watch on the wrist (e.g., the front or back), and/or the like. In this manner, the tuning module 306 can calibrate the sensors incorporated in this device 102, such as calibrating a gravity sensor, an accelerometer, one or more microphones, a proximity sensor, and/or the like.

In one embodiment, the electronic device 102 comprises a calibration sensor configured to calibrate the electronic device 102. In one embodiment, the calibration sensor automatically calibrates the sensors of the device 102 based on the initial location of the device 102. For example, a watch comprising a calibration sensor may include a body sensor that determines how close the watch is to the body and/or the bone density of bones in close proximity to the watch to determine where the watch is located on the body. Alternatively, a camera may be used to determine which hand the watch is being worn on. The calibration module 306, in another embodiment, determines the initial location of the device 102 based on an initial gesture and/or an initial movement of the device 102.

In a further embodiment, the customization module 308 defines a feature-enabling gesture based on user input such that a user-defined gesture is associated with a feature of the electronic device 102. The customization module 308, in certain embodiments, places the electronic device 102 in a learning mode such that one or more gestures performed by a user may be associated with a feature of the electronic device 102. For example, after the electronic device 102 is placed in the learning mode, the user may select a feature from a plurality of features and specify the gesture that is associated with that feature by performing the gesture. Additionally, one or more secondary gestures may also be performed and associated with the feature of the electronic device 102 by the customization module 308.

Figure 4:
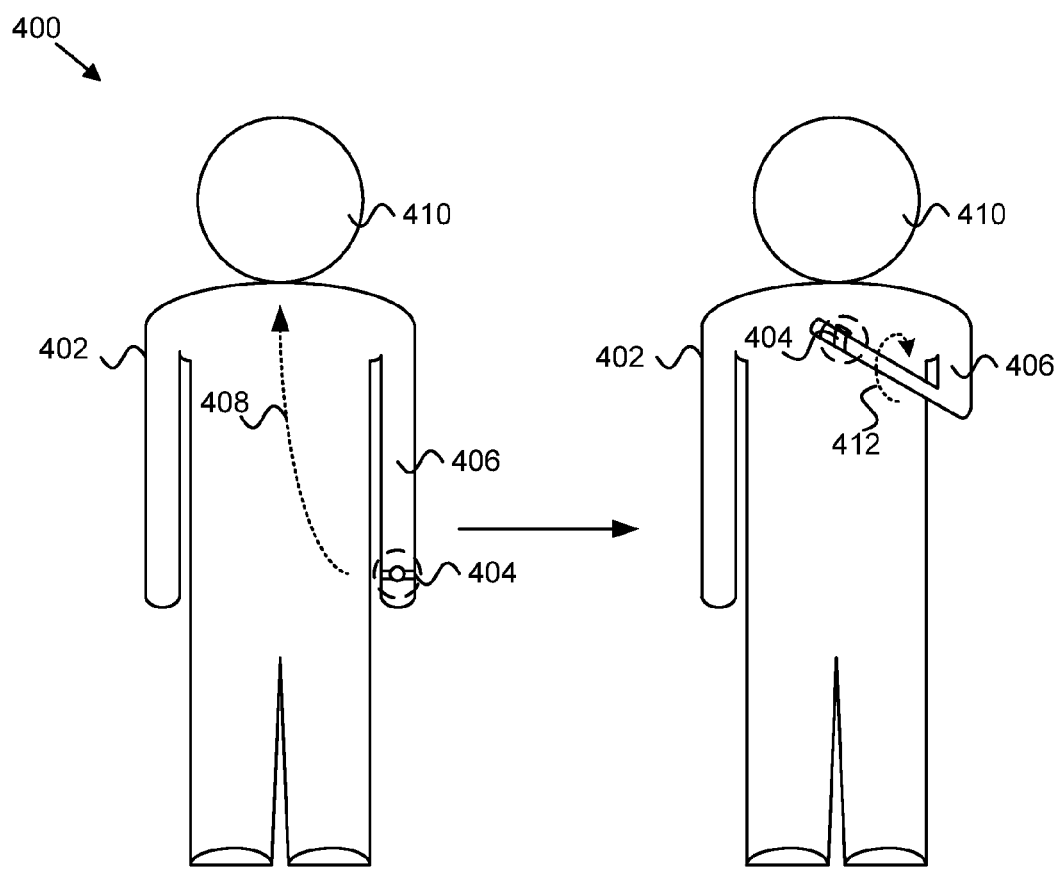
FIG. 4 illustrates one embodiment of enabling device features according to an input gesture.

FIG. 4 depicts one embodiment of enabling device features according to gesture input. The depicted embodiment includes a user 402 wearing an electronic device 404, which may include a smart watch, or the like. The setup module 202, in one embodiment, determines the initial position of the watch 404 on the user's 402 arm 406. As the user 402 moves the watch 404 towards his face 410 in the upward direction 408, the gesture module 204 may detect this movement and begin detection of a gesture. As the watch 404 gets closer to the user's 402 face, the user may rotate 412 his arm 406 to look at the watch 404. The gesture module 204 may detect this secondary gesture (e.g., the user 402 rotating 412 his arm), which, together with the primary gesture of moving 408 the arm 406 towards the user's 402 face 410, may constitute a feature-enabling gesture. In response to the feature-enabling gesture, the feature module 206 may enable a feature of the watch 404, such as turning on the display, enabling voice activation, and/or the like.

Figure 5:
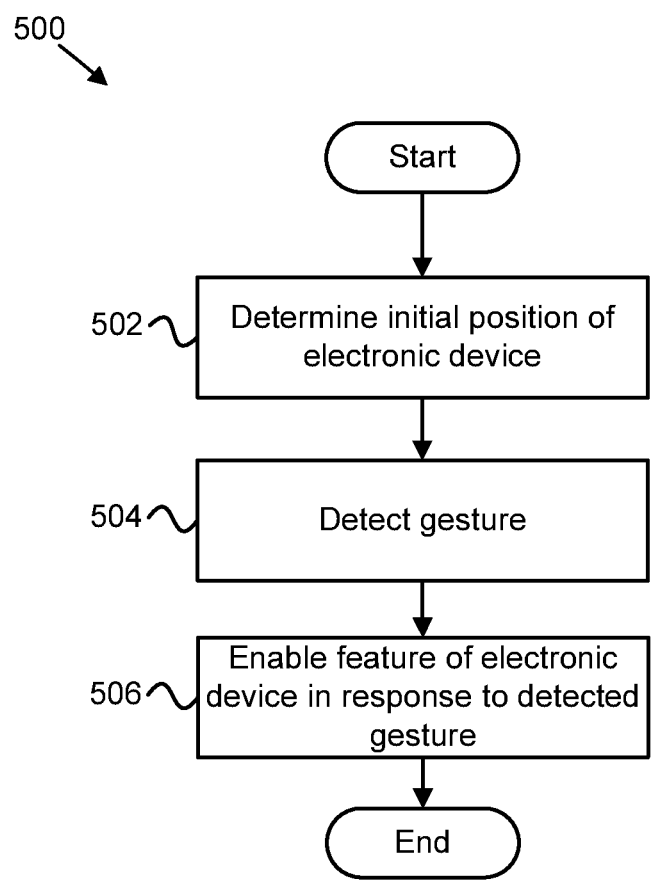
FIG. 5 is a schematic flow chart diagram illustrating one embodiment of a method for enabling device features according to gesture input.

FIG. 5 depicts one embodiment of a method 500 for enabling device features according to gesture input. In one embodiment, the method 500 begins and the setup module 202 determines 502 an initial position of the electronic device 102. In certain embodiments, the setup module 202 uses one or more sensors located on the device 102 to determine the initial position of the device 102.

In another embodiment, a gesture module 204, based on movement away from the initial position, detects 504 a gesture using one or more gesture detectors located on the electronic device 102. The gesture detectors, in certain embodiments, include proximity sensors, accelerometers, gravity sensors, capacitance sensors, and/or the like. In a further embodiment, a feature module 206 enables 506 a feature of the device 102 in response to the detected gesture being a feature-enabling gesture. In certain embodiments, if the detected gesture is not a feature-enabling gesture (e.g., the gesture is not associated with a feature of the device 102), the gesture is ignored, and the method 500 ends.

Figure 6:
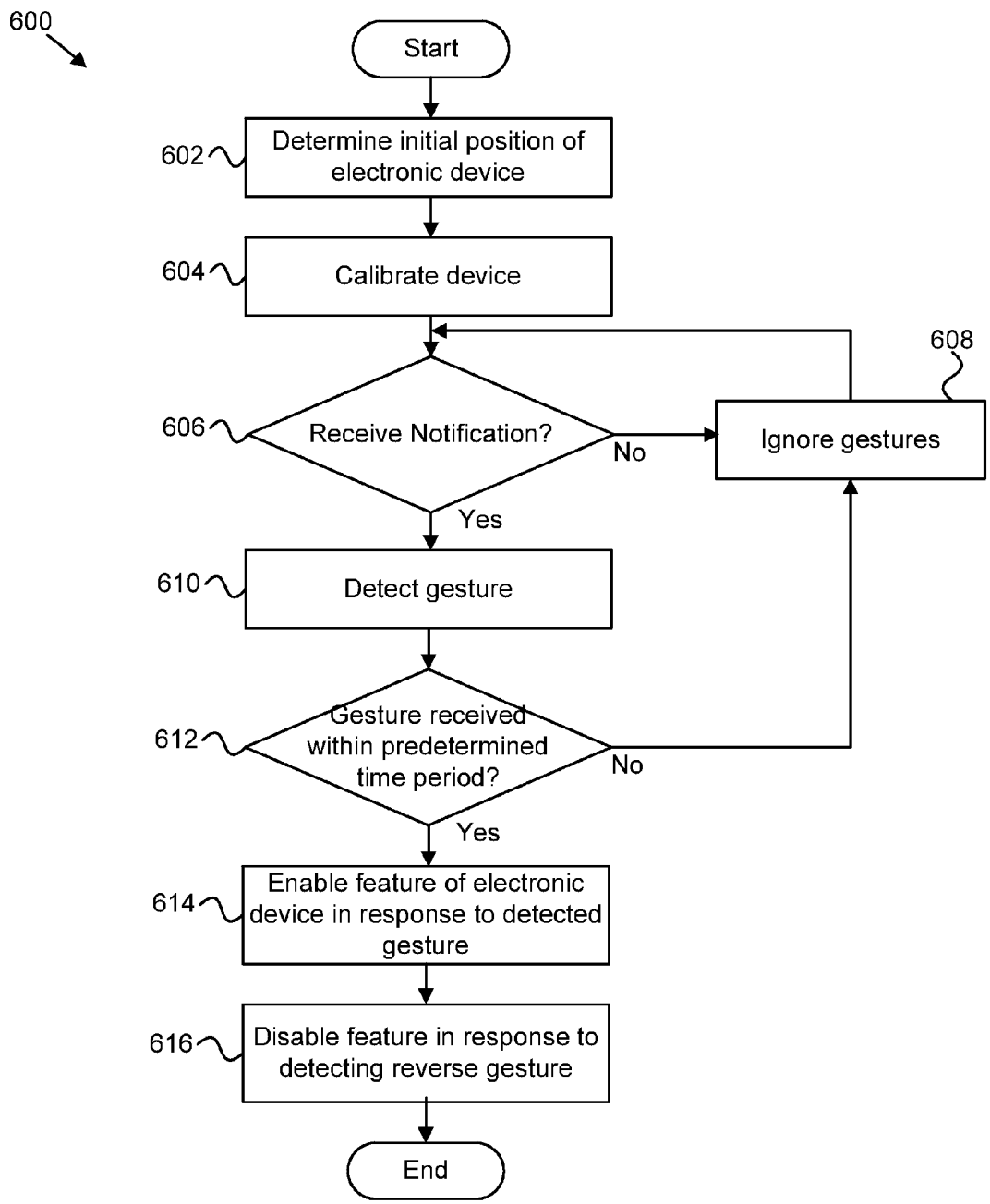
FIG. 6 is a schematic flow chart diagram illustrating another embodiment of a method for enabling device features according to gesture input.

FIG. 6 depicts one embodiment of another method 600 for enabling device features according to gesture input. In one embodiment, the method 600 begins and a setup module 202 determines 602 the initial position of the electronic device 102 using a positioning sensor located on the electronic device 102. In a further embodiment, a tuning module 306 calibrates 604 one or more gesture detectors located on the electronic device 102 based on the initial position of the electronic device 102. In certain embodiments, the electronic device 102 includes a calibration sensor that is configured to calibrate the electronic device 102.

In one embodiment, a notification module 304 determines 606 if a notification has been received on the electronic device 102. If the notification module 304 determines 606 that a notification has not been received, any gestures performed will be ignored 608 by the feature module 206 until the notification module 304 determines 606 a notification has been received. If the notification module 304 determines 606 a notification has been received, the gesture module 204, based on the initial position of the device 102, detects 610 a gesture using a gesture detector located on the electronic device 102.

The notification module 304, in another embodiment, determines 612 whether the detected gesture was performed within a predetermined period of time after receiving the notification. If the notification module 304 determines 612 that the gesture was not received within the predetermined period of time, the feature module 206 ignores 608 the gesture. If the notification module 304 determines 612 the gesture was performed within the predetermined period of time, the feature module 206 enables 614 a feature of the electronic device 102 in response to the detected input gesture. In certain embodiments, the enabled features include turning on a display, enabling voice activation, and/or the like. In a further embodiment, a deactivate module 302 disables 616 the enabled feature in response to detecting the gesture performed in reverse order, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

determining an initial position of an electronic device worn on a user's arm using a positioning sensor located on the electronic device in response to detecting that movement of the user's arm is below a predetermined threshold;

calibrating the one or more gesture detectors located on the electronic device based on the initial position of the electronic device, wherein the electronic device comprises a calibration sensor configured to calibrate the electronic device;

detecting, based on movement away from the initial position, a primary gesture using a gesture detector located on the electronic device, the primary gesture comprising detecting a movement of the user's arm;

detecting a secondary gesture in response to the primary gesture, the secondary gesture comprising an additional action by the user that corresponds to the primary gesture, the primary gesture and the secondary gesture comprising a feature-enabling gesture for enabling one or more features of the electronic device;

enabling the feature of the electronic device in response to the feature-enabling gesture; and disabling the enabled feature of the electronic device in response to one of performing the feature-enabling gesture in reverse and performing the feature-enabling gesture.

2. The method of claim 1, wherein the electronic device comprises a wearable device, and wherein the initial position of the wearable device is determined based on the position of the wearable device on a user's body.

3. The method of claim 1, wherein enabling a feature of the electronic device comprises enabling speech recognition capabilities of the electronic device such that the electronic device recognizes voice commands provided by a user.

4. The method of claim 3, wherein the electronic device comprises a plurality of microphones configured to detect voice input, and wherein at least a portion of the microphones are enabled in response to the detected gesture.

5. The method of claim 3, wherein the electronic device performs a task associated with a voice command in response to detecting a predetermined gesture.

6. The method of claim 3, wherein speech recognition is enabled in response to a completed gesture such that voice commands are not received while the gesture is being performed.

7. The method of claim 1, wherein enabling a feature of the electronic device comprises enabling a display of the electronic device.

8. The method of claim 1, wherein a feature-enabling gesture not performed within a predetermined period of time is ignored.

9. The method of claim 1, wherein the electronic device comprises a low-power state and a high-power state, the low-power state configured to detect movement within a predetermined movement threshold, the high-power state configured to detect movement exceeding the predetermined movement threshold, and wherein a gesture is detected in response to the electronic device switching from a low-power state to a high-power state.

10. The method of claim 1, further comprising defining a feature-enabling gesture based on user input such that a user-defined gesture is associated with a feature of the electronic device.

11. An apparatus comprising:
a processor;
a positioning sensor operably coupled to the processor;
a memory that stores machine readable code executable by the processor;
  a setup module that determines an initial position of an electronic device worn on a user's arm using the positioning sensor located on the electronic device in response to a predetermined amount of time elapsing after detecting that movement of the user's arm is below a predetermined threshold;
  a tuning module that calibrates the one or more gesture detectors located on the electronic device based on the initial position of the electronic device, wherein the electronic device comprises a calibration sensor configured to calibrate the electronic device;
  a gesture module that:
    detects, based on movement away from the initial position, a primary gesture using a gesture detector located on the electronic device, the primary gesture comprising detecting a movement of the user's arm; and
    detects a secondary gesture in response to the primary gesture, the secondary gesture comprising an additional action by the user that corresponds to the primary gesture, the primary gesture and the secondary gesture comprising a feature-enabling gesture for enabling one or more features of the electronic device;
  a feature module that enables the feature of the electronic device in response to the feature-enabling gesture; and
  a deactivate module that disables the enabled feature of the electronic device in response to one of performing the feature-enabling gesture in reverse and performing the feature-enabling gesture.

12. The apparatus of claim 11, further comprising a notification module that ignores a feature-enabling gesture in response to the feature-enabling gesture not being performed within a predetermined period of time after receiving a notification.

13. The apparatus of claim 11, further comprising a customization module that defines a feature-enabling gesture based on user input such that a user-defined gesture is associated with a feature of the electronic device.

14. The apparatus of claim 11, wherein the electronic device is a wearable device, and wherein the initial position of the wearable device is determined based on the position of the wearable device on a user's body.

15. A program product comprising a non-transitory computer readable storage medium storing machine readable code executable by a processor to perform:
determining an initial position of an electronic device worn on a user's arm using a positioning sensor located on the electronic device in response to a predetermined amount of time elapsing after detecting that movement of the user's arm is below a predetermined threshold;
calibrating the one or more gesture detectors located on the electronic device based on the initial position of the electronic device, wherein the electronic device comprises a calibration sensor configured to calibrate the electronic device;
detecting, based on movement away from the initial position, a primary gesture using a gesture detector located on the electronic device, the primary gesture comprising detecting a movement of the user's arm;
detecting a secondary gesture in response to the primary gesture, the secondary gesture comprising an additional action by the user that corresponds to the primary gesture, the primary gesture and the secondary gesture comprising a feature-enabling gesture for enabling one or more features of the electronic device;
enabling the feature of the electronic device in response to the feature-enabling gesture; and
disabling the enabled feature of the electronic device in response to one of performing the feature-enabling gesture in reverse and performing the feature-enabling gesture.

* * * * *